Jan. 27, 1970     J. ABATE, JR., ET AL     3,491,432
METHOD AND MACHINE FOR ASSEMBLING AND SHAPING
ARTIFICIAL TREE LIMBS AND BRANCHES
Filed Aug. 15, 1967     10 Sheets-Sheet 7

INVENTORS
JOSEPH ABATE, JR.
MICHAEL DREISTADT, SR.
BY John N. Randolph
ATTORNEY

United States Patent Office 3,491,432
Patented Jan. 27, 1970

3,491,432
METHOD AND MACHINE FOR ASSEMBLING AND SHAPING ARTIFICIAL TREE LIMBS AND BRANCHES
Joseph Abate, Jr., Moosic, and Michael Dreistadt, Sr., Old Forge, Pa., assignors to Star Products, Inc., Moosic, Pa., a corporation of Pennsylvania
Filed Aug. 15, 1967, Ser. No. 663,471
Int. Cl. B21d 39/00; B23p 11/00
U.S. Cl. 29—505
14 Claims

ABSTRACT OF THE DISCLOSURE

A method and machine for attaching branches composed of a core of twisted wires having a multiplicity of bristles radiating in all directions from end portions thereof to a limb likewise composed of a core of twisted wires having a multiplicity of bristles radiating in all directions from one end portion thereof, by winding the bare intermediate portion of the branch core around a part of the portion of the core of the limb from which the bristles project, so that the bristle bearing end portions of the branch core form two branches which project from the bristle bearing portion of the limb core. The bristles at the extremities of the branches and the limb are thereafter drawn outwardly and tapered for covering the tips of the twisted wire cores at said extremities and while the branches are bent and held adjacent the bristle bearing end of the limb. The branches are thereafter bent to desired angles relative to the bristle bearing end of the limb. At the same time, said branch ends and the limb are bent upwardly at points located between their terminals and the point of attachment of the branches to the limb. Simultaneously, the terminal of the other bare end of the core of the limb is bent downwardly to produce an artificial Christmas tree limb and branches ready to be applied to a downwardly and inwardly inclined socket of an artificial tree trunk.

Background of the invention

This invention relates primarily to the art of producing artificial limbs and branches for artificial Christmas trees from previously formed limb and branch members.

The prior art discloses machines capable of producing the artificial limbs and branches, such as applicants' prior U.S. Patent No. 3,223,453, issued Dec. 14, 1965; and assembled limbs and branches. However, the prior art does not disclose a machine or method by means of which such preformed limbs and branches may be connected together and shaped ready for application to a tree trunk by continuous automatic operations requiring only the applying of the limbs and branches to the machine and placing the machine in operation by closing a starting switch.

Summary

Accordingly, it is a primary object of the present invention to provide a novel method and machine whereby previously formed limbs and branches are connected together and shaped ready for application to the trunk of an artificial Christmas tree.

Another object of the invention is to provide a machine in which the limbs are supported and intermediately conveyed while the branches are being automatically attached thereto, the bristles at the tips of the assembled limb and branches are being tapered for covering the twisted wire cores at said tips, and while the assembled limb and branches are thereafter bent and shaped to most nearly simulate natural limb and branch configurations of different species of evergreens normally utilized as Christmas trees.

A further object of the invention is to provide novel means for holding a limb and branch and for winding the bare twisted core portion of the branch around the core of the limb for anchoring the branches to the limb.

A further object of the invention is to provide a machine having novel means for shaping the assembled branches and limb and by which the assembled parts are conveyed, after having been connected together, and without requiring any manual operation other than setting the machine in operation by the closing of a switch.

Various other objects and advantages of the invention will hereinafter become more fully apparent from the following description of the drawings, illustrating a presently preferred embodiment thereof, and wherein:

Brief description of the drawings

FIGURE 3 is an enlarged fragmentary end elevational view, looking from left to right of FIGURE 2;

FIGURE 9 is a fragmentary vertical sectional view, taken substantially along the line 9—9 of FIGURE 5;

FIGURE 18 is a cross sectional view taken substantially along a plane as indicated by the line 18—18 of FIGURE 16;

Description of the preferred embodiment

Figure 1:
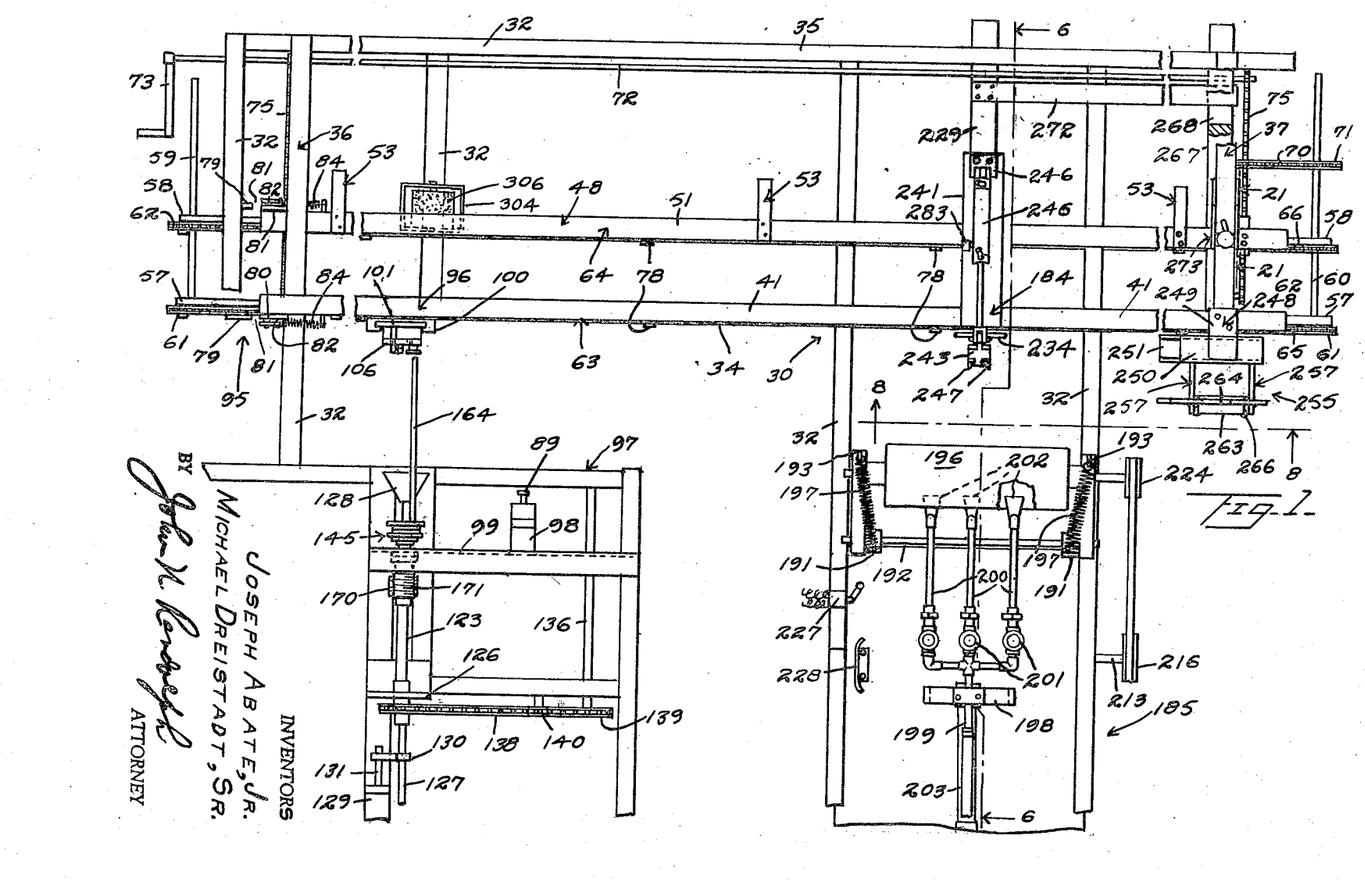
FIGURE 1 is a fragmentary top plan view of the machine.

Referring more specifically to the drawings, the machine for assemblying and shaping artificial tree limbs and branches in its entirety and, as best seen in FIGURES 1 to 4, is designated generally 30 and includes an elongated supporting frame structure 31, including substantially horizontal top members 32 interconnected with one another and supported by a plurality of depending legs 33 and having a front side 34 and a rear side 35 (FIGURE 1).

Figure 2:
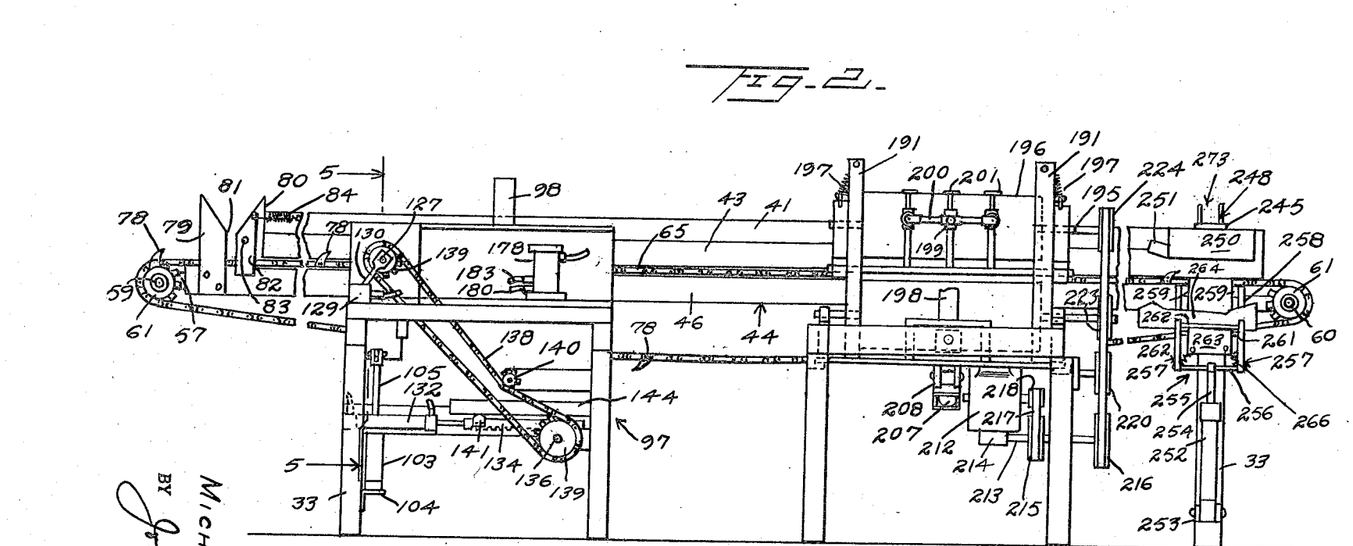
FIGURE 2 is a fragmentary side elevational view thereof, looking from right to left to FIGURE 3.
Figure 6:
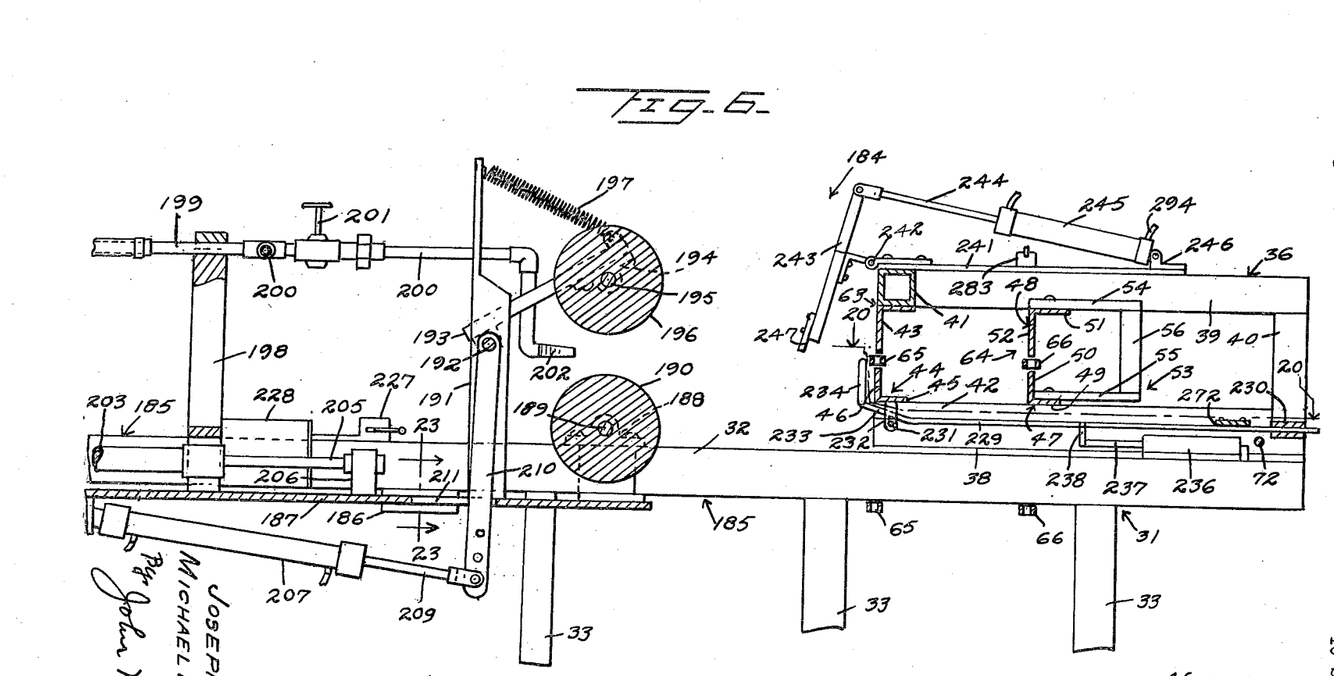
FIGURE 6 is an enlarged fragmentary cross sectional view, taken substantially along the line 6—6 of FIGURE 1.

Two large chain guide supporting frames 36 and 37 are mounted on the supporting structure 31 adjacent its ends and crosswise thereof, each of which includes a lower tubular member 38, an upper tubular member 39 and a rear tubular member 40 which extends between and is secured to the rear ends of the members 38 and 39. The members 38, 39 and 40 are preferably of square cross section. A tubular member 41 extends between and is secured to the forward ends of the upper tubular members 39 of the two frames 36 and 37, as seen in FIGURES 1 and 6. As seen in FIGURE 6, a rail 42 is mounted on and secured to the upper side of each bottom member 38. An upper chain guide member 43 is secured to and depends from the member 41 and extends substantially from end-to-end of the machine, as seen in FIGURE 2, and a lower chain guide member 44 has a rearwardly extending horizontal flange 45 which is secured to the rails 42 and an upstanding vertical flange 46 which is disposed directly beneath and coplanar with the upper chain guide 43. The lower chain guide 46 likewise extends substantially from end-to-end of the supporting structure 31.

A second pair of chain guides is disposed behind the chain guides 43 and 44 and includes a lower guide 47 and an upper guide 48, each of which is of angular cross section, as seen in FIGURE 6. The lower guide 47 has a rearwardly extending horizontal flange 49 which slidably engages the rails 42 and an upstanding vertical flange 50. The upper chain guide 48 has a rearwardly extending horizontal top flange 51 and a depending vertical flange 52, the bottom edge of which terminates directly above and spaced from the top edge of the flange 50. The chain guides 47 and 48 likewise extend substantially from end-to-end of the supporting structure 31, as seen in FIGURE 1. The chain guides 47 and 48 are connected by a plurality of frames 53, each including a top bar 54 and a bottom bar 55. The bars 54 and 55 are secured to the upper side of the flanges 49 and 51 and extend rearwardly therefrom. Each frame 53 includes a vertical tubular member 56 which extends between and is secured to the rear ends of the bars 54 and 55. Three or more of the frames 53 are utilized for supporting the chain guides 47 and 48, as seen in FIGURE 1.

Bearings 57 are secured to and extend from the ends of the lower chain guides 44, and bearings 58 are secured to and extend from the ends of the other lower chain guide 47. The bearings 57 and 58, at one end of the supporting structure 31, support and journal a shaft 59, and the bearings 57 and 58, at the other end of the structure 31, support and journal a shaft 60. Sprocket wheels 61 are fixed to the forward ends of the shafts 59 and 60 and sprocket wheels 62 are splined to the shafts 59 and 60 behind the sprocket wheels 61. The sprocket wheels 62 are rotatably connected to the bearings 58 which slidably engage the shafts 59 and 60 so that such sprocket wheels 62 and bearings 58 can move with the rear chain guide 64, toward and away from the front chain guide 63.

Figure 4:
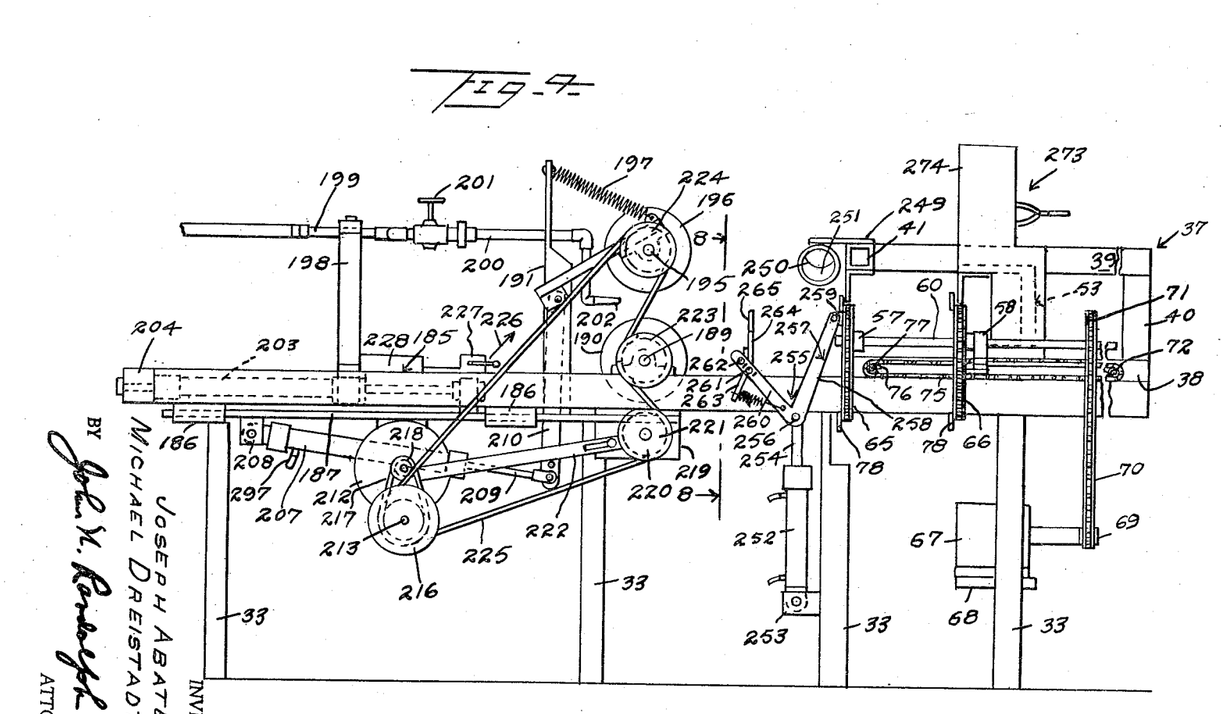
FIGURE 4 is an end elevational view looking from right to left of FIGURE 2, and on an enlarged scale.

As seen in FIGURE 2, an endless chain 65 is trained over the two sprocket wheels 61 and has its upper flight disposed for travel between the chain guides 43 and 44, as seen in FIGURE 6. A second endless chain 66 is trained over the two sprocket wheels 62 and has its upper flight disposed for movement between the flanges 50 and 52 of the rear chain guide 64. An electric motor 67 is secured to a bracket 68 which is mounted on one of the legs 33, as seen in FIGURE 4, and has a sprocket wheel 69 secured to its armature shaft. An endless chain 70 is trained over the sprocket wheel 69 and over a sprocket wheel 71, which is secured to the rear end of the shaft 60, for driving the sprocket wheels 61 and 62, said shaft, the endless chains 65 and 66, the other sprocket wheels 61 and 62, and the shaft 59 on which said last mentioned sprocket wheels are mounted.

A shaft 72 extends through and is journaled in the two bottom members 38 and has a crank 73 secured to one end thereof, as seen in FIGURE 1. The shaft 72 is located adjacent the rear of the frame structure 31 and has sprocket wheels 74 fixed thereto and over which two chains 75 are trained, as seen in FIGURES 1 and 4. The chains 75 are trained around sprocket wheels 76 which are journaled on stub shafts 77 which extend from the members 38, adjacent the endless chain 65, and said chains 75 are connected to the lower chain guide 47, so that when the shaft 72 is rotated by the crank 73, the chains 75 will be driven for moving the rear chain guide 64 on the rails 42, toward or away from the front chain guide 63 and crosswise of the supporting structure 31.

A plurality of lugs 78 are fastened to and extend from the chains 65 and 66 and are disposed to slidably engage forward sides of the two upper chain guides 43 and 48.

As seen in FIGURES 1 and 2, the lower chain guides 44 and 47 at their left hand ends each have an upstanding member 79. The upper members 43 and 48 are provided with upstanding members 80 which are spaced from the members 79, to provide a slot 81 between the members 79 and 80 of each of the chain guides 63 and 64 through which the bare twisted stem of an artificial Christmas tree limb is applied to the upper flights of the chains 65 and 66, which flights move from left to right of FIGURES 1 and 2, due to the travel of the two chains in a clockwise direction, as seen in FIGURE 2. A plate 82 is pivoted at 83 to each of the members 80 and is normally held by a pull spring 84 in substantially an upright position, so that the lower portions of the plates 82 extend downwardly across the upper flights of the chains 65 and 66 to prevent movement of the limb cores with the chains 65 and 66 until a core disposed in the slots 81 is engaged by a lug 78 of each chain, which lugs are arranged in transverse alignment. When this occurs the lugs propel the tree limb with the upper flights of the chains 65 and 66 and the plates 82 are caused to swing counterclockwise to permit the core of the limb to pass therebeneath.

The artificial tree limb, designated generally 85 (FIGURE 25), and the artificial tree branch, designated generally 86 (FIGURE 24), is of conventional construction and is fully illustrated in Patent No. 3,278,364, issued Oct. 11, 1966. The limb 85 comprises a core 87 formed of two tightly twisted wires. A multiplicity of filaments 88 are anchored in one end portion of the core 87 and radiate therefrom in all directions to provide a filament or bristle mass of circular cross section and having the core as its center. The other end portion of the core 87 which is left bare is engaged by the chains 65 and 66 and the hooks 78, and the bristle bearing end portion projects outwardly from the front chain guide 63, at substantially a right angle to the plane thereof.

Figures 10, 13, 14, 19:
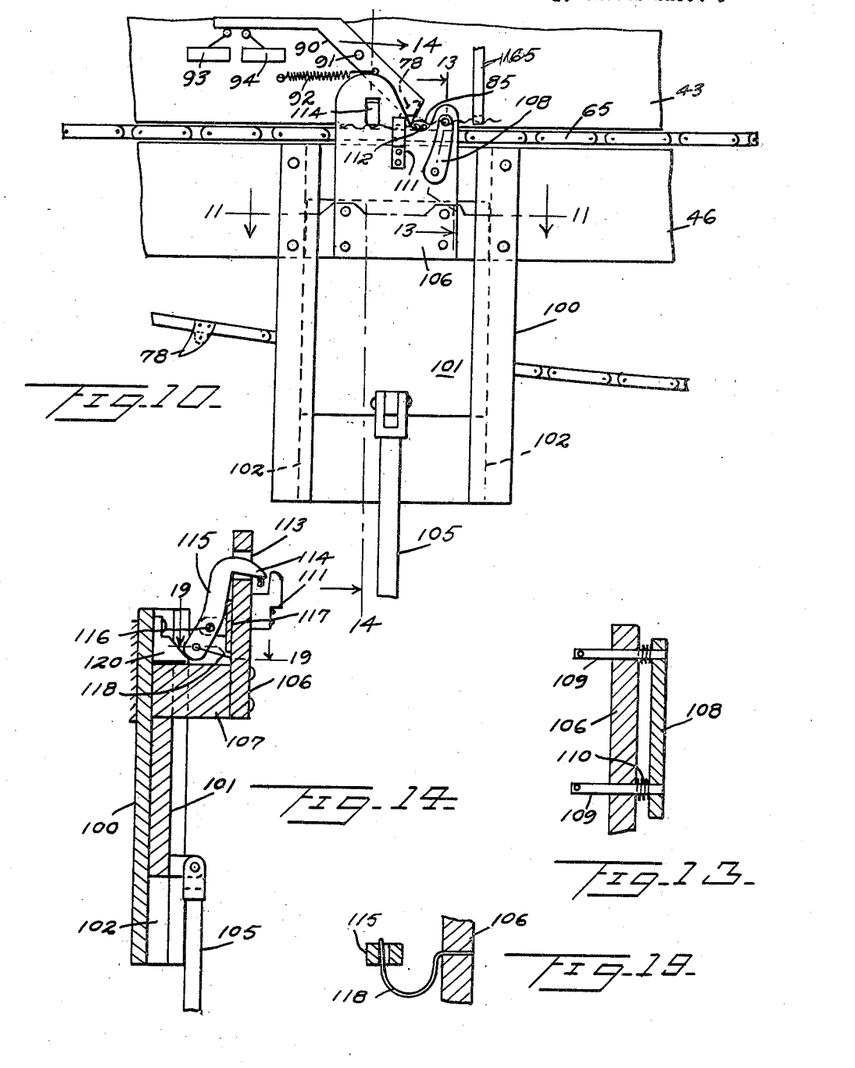
FIGURE 10 is an enlarged fragmentary vertical sectional view, taken substantially along a plane as indicated by the line 10—10 of FIGURE 5.
FIGURE 14 is a fragmentary vertical sectional view, taken substantially along a plane as indicated by the line 14—14 of FIGURE 10.
FIGURE 19 is an enlarged fragmentary sectional view, taken substantailly along the line 19—19 of FIGURE 10.
Figure 11:
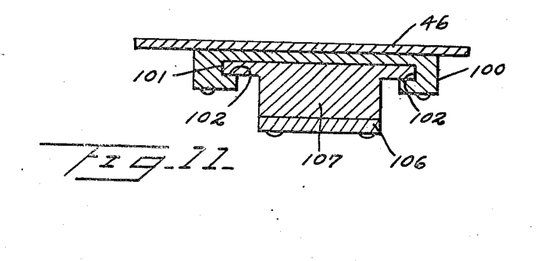
FIGURE 11 is a fragmentary horizontal sectional view, taken substantially along the line 11—11 of FIGURE 10.

The entrance slots 81, through which the bare cores 87 of the artificial limbs 85 are applied to the chains 65 and 66 constitutes a first station of the machine 30. A lug 78 of each chain is disposed to engage the bare stem 87 as the chains 65 and 66 are placed in operation by the operator who manually closes an electric switch 89 (FIGURE 5) after applying the limb core through the slots 81. This closes an electric circuit to the motor 67 for driving the upper flights of the two chains 65 and 66 from left to right until the stem or core 87 strikes an end of an arm 90 which extends across the outer side of the chain 65 and which is pivoted at 91 on the front side of the chain guide 43. The aforementioned end of the arm 90 is normally held extending across the chain 65 to be engaged by the stem 76, by a pull spring 92. Two micro-switches 93 and 94 are mounted on the outer side of the guide 43 beneath the other end of the arm 90, so that when said arm is rocked counterclockwise by engagement of the core 87 therewith, said micro-switches will be closed to interrupt movement of the chains 65 and 66 by de-energizing the motor 67, so that the core 87 will be disposed as seen in FIGURE 10 in what constitutes a dwell position for the second station. At this point, the two lugs 78 which are trailing the lugs 78 which engage the core 87 will be disposed to engage the core 87 of the next limb, which is applied through the entrance slots 81, when travel of the chains 65 and 66 is resumed.

The entrance slots 81 where the limb cores are initially applied to the machine 30 constitute a first station 95 of said machine, and the dwell position, as seen in FIGURE 10, where the core 87 strikes the arm 90, constitutes a second station 96 of the machine. A table 97, as seen in FIGURES 1 and 2, is disposed in front of the frame structure 31 at the second station 96 and is rigidly connected to said frame structure by an extension of one of the horizontal members 32 thereof. The switch 89 is mounted on a bracket 98 which is secured to the vertical wall 99 of the table 97.

Figures 1A, 13:
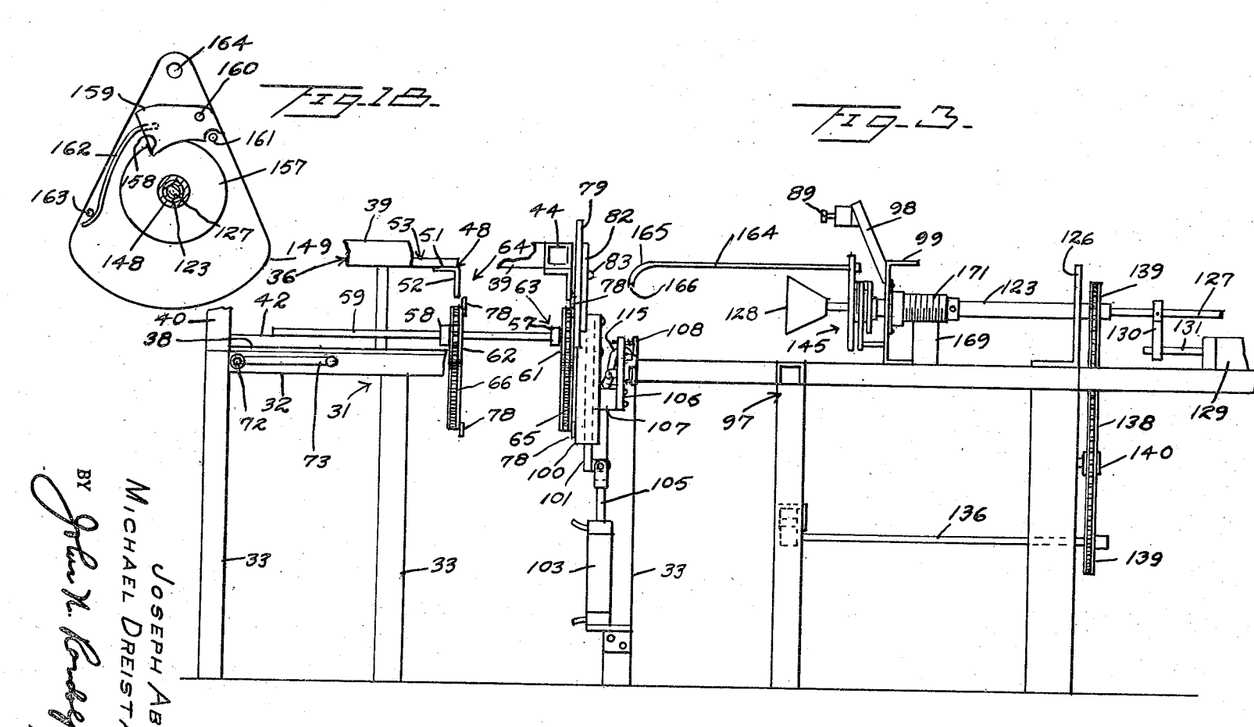
FIGURE 13 is an enlarged fragmentary vertical sectional view, taken substantially along the line 13—13 of FIGURE 10.

Referring to FIGURES 3 and 10, a guide member 100 is secured to the forward side of the chain guide 46 at the second station 96 and extends downwardly therefrom to mount a plate 101 which is disposed for vertical sliding movement in guide way 102 of the guide 100. A pneumatic cylinder 103 is secured to a bracket 104 which is mounted on one of the legs 33 and has an upwardly extending piston rod 105 which is connected to the plate 101. A plate 106 is offset from the plate 101, in a direction away from the guide 100 and chain guide 46 by a block 107 which is secured to and extends from the upper part of the plate 101. As seen in FIGURES 10 and 13, a pad 108 is supported adjacent the right hand edge of the plate 106 by stems 109 which extend slidably through the plate 106 and which carry compression springs 110 for urging the pad 108 away from the plate 106 and guide 100.

A hook member 111, which opens upwardly, is disposed approximately midway of the side edges of the plate 106. The upper edge of the plate 106 is provided with an upwardly opening recess 112, between the pad 108 and hook 111, in which the core 87 is received when the plate 101 is in its raised, operative position of FIGURES 10 and 14.

An opening 113 is formed near the other side edge of the plate 106, above the hook 111, to receive the bill 114 of a hook 115 which is pivotally mounted at 116 on a bracket 117, which is secured to the other side of the plate 106. A spring 118, as best seen in FIGURE 19, is connected to the plate 106 and to the hook 115, beneath the pivot 116, to urge the hook 115 in a clockwise direction to cause the bill 114 thereof to be projected through the opening 112. A fixed cam member 120 is secured to the guide 100 in a position to engage the lower end of the hook 115 as the parts 101 and 106 move upwardly and downwardly.

Figure 7:
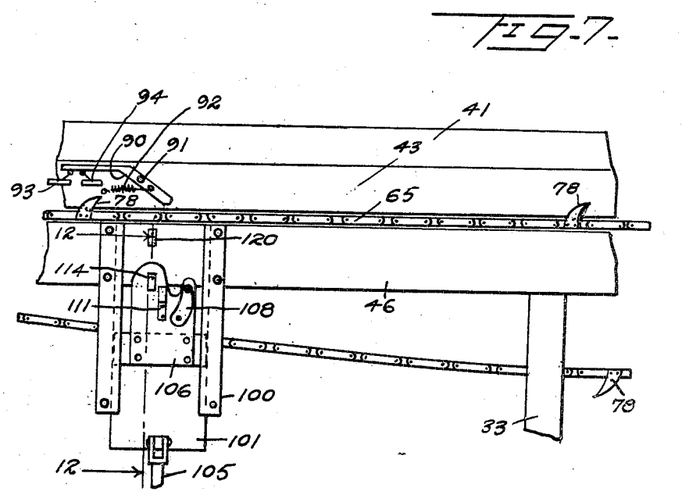
FIGURE 7 is a fragmentary longitudinal sectional view, taken substantially along a plane as indicated by the line 7—7 of FIGURE 5.

When the limb care 87 stops at the second station 96, the plates 101 and 106 are in their lowered position of FIGURE 7. The lower end of the cylinder 103 is pressurized, as will hereinafter be more fully described, to move said parts to their raised operative positions of FIGURES 10 and 14 with the core 87 engaging in the recess 112. As the plate 106 moves upwardly, the lower end of the hook 115 strikes the cam 120 to rock the hook 115 counterclockwise so that the lower hook end may move upwardly past the cam 120. After passing the cam 120, the bill 114 of the hook is projected through the opening 113 by the spring 119. In the raised position of the 106, the core 87 engages in the recess 112.

The branch 86, which is constructed in the same manner as heretofore described in reference to the limb 85, except that the intermediate portion of its twisted wire core 121 (FIGURE 24) is left bare and the end portions thereof are provided with masses of fibers 122 corresponding to the fibers or filaments 88, as heretofore described. The operator places the branch 86 across the filament bearing portion 88 of the limb 85 with the bare intermediate portion 121 of the core engaging on the limb. A part of the branch 86 extends across the outer side of the pad 108 and another part thereof engages in the upwardly opening hook 111 and under the hook bill 114 in this position, the branch is ready to be wound about the limb and anchored thereto, as will hereinafter be described.

Figures 5, 24:
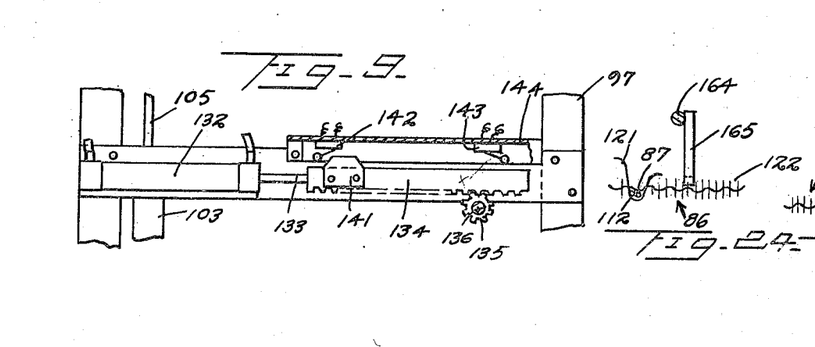
FIGURE 5 is an enlarged fragmentary cross sectional view, taken substantially along the line 5—5 of FIGURE 2.
FIGURE 24 is a fragmentary diagrammatic view, illustrating a part of the operation of the machine.

As best seen in FIGURE 5, a hollow shaft 123 is journaled in a bearing 124 which is secured to the wall 99 and in an opening 125 of a wall 126 which is secured on the table 97 behind the wall 99. A rod 127 fits slidably in and extends through the hollow shaft 123 and has a cone 128 on the end thereof disposed nearest the frame 31, the center of which aligns with the notch or recess 112, in its position of FIGURE 10. As seen in FIGURES 1 and 3, a pneumatic cylinder 129 is secured on the table 97 parallel to the rod 127. A clamp 130 connects the rod 127, near its other end, to the piston rod 131 of the cylinder 129 so that when the cylinder 129 is pressurized to project the piston rod 131, the rod 127 and cone 128 will be displaced from right to left of FIGURE 5. This occurs as the plates 101 and 106 are moved upwardly to cause the cone to be advanced over the bristle bearing end 88 of the limb 85 to hold said limb end steady during the winding of the branch thereon, as will hereinafter be more fully described.

A pneumatic cylinder 132, as seen in FIGURES 5 and 9, is supported by the table 97 beneath and crosswise of the hollow shaft 123 and has a piston rod 133 extending therefrom and secured to one end of a rack bar 134 which meshes with a pinion 135. Pinion 135 is secured to a shaft 136 which is journaled in bearings 137 of the table 97 and which is disposed parallel to the shaft 123. An endless chain 138 is trained over sprocket wheels 139 which are fixed to the shafts 123 and 136, for driving the shaft 123 from the shaft 136 when the rack bar 134 is actuated by inward or outward movement of the piston rod 133. One flight of the chain 138 may be trained around an idler sprocket wheel 140 for tensioning the chain.

As seen in FIGURE 9, a switch actuating cam 141 is carried by the rack bar 134 to engage and actuate microswitches 142 and 143 at the extremities of travel of the rack bar 134. The switches 142 and 143 are mounted on a support 144 which is secured to a part of the table 97.

Figures 5, 15, 16, 17:
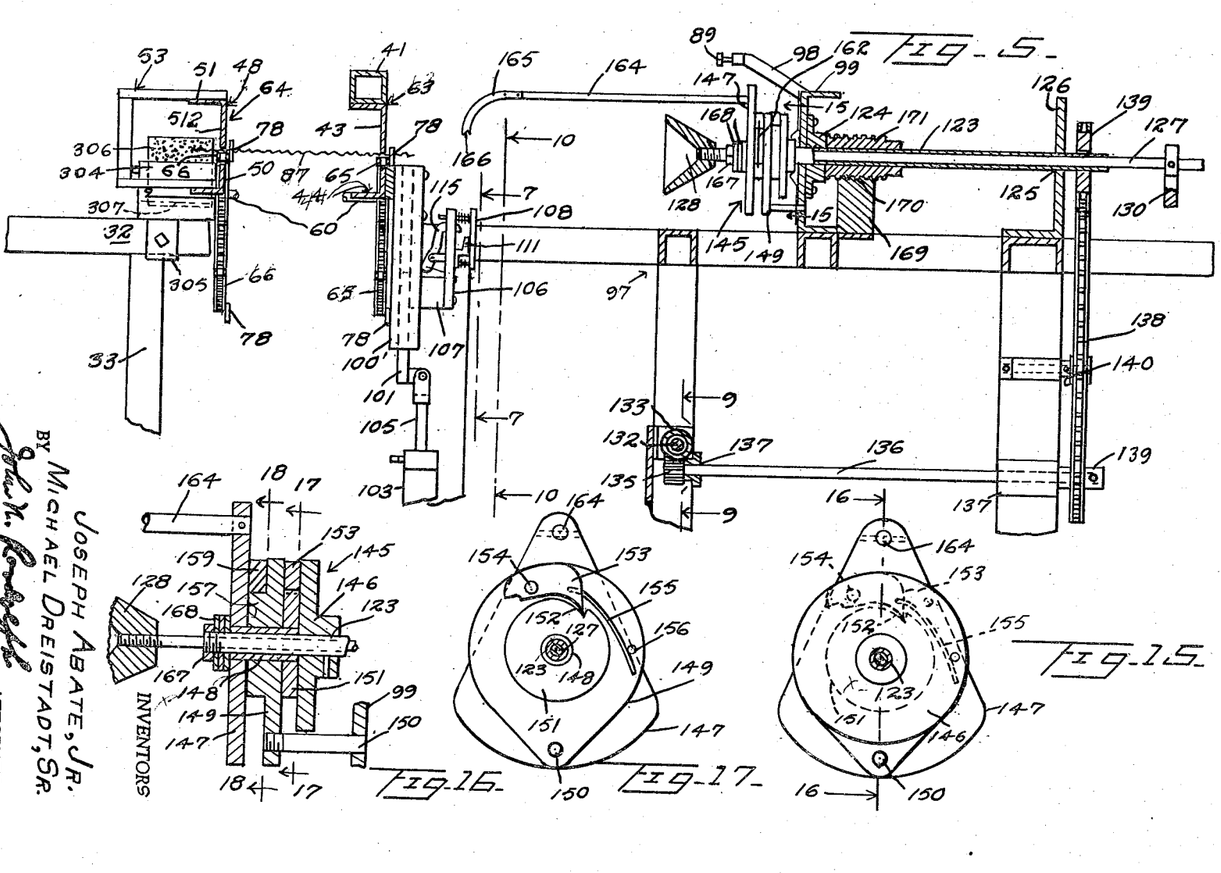
FIGURE 15 is an enlarged cross sectional view, taken substantially along a plane as indicated by the line 15—15 of FIGURE 5.
FIGURE 16 is a fragmentary vertical sectional view, taken substantially along a plane as indicated by the line 16—16 of FIGURE 15.
FIGURE 17 is a cross sectional view taken substantially along a plane as indicated by the line 17—17 of FIGURE 16.

A drive unit 145, as best seen in FIGURES 5, 15–18, is mounted on the hollow shaft 123 between the wall 99 and the guide 100 and includes a disc 146 which is disposed next to the wall 99 and fixed to the shaft 123. A disc 147 is mounted on the outer end of a bushing 148 which is journaled on the shaft 123 between the disc 146 and the cone 128. A disc 149 is mounted on the shaft 123 between the discs 146 and 148 and has a rod 150 extending therefrom and slidably mounted in the wall 99 for holding the disc 149 against rotation, so that the shaft 123 rotates therein. A ratchet wheel 151 is fixed to the other end of the bushing 148, and is disposed between the discs 146 and 149 and has a single tooth or notch 152 facing counterclockwise, as seen in FIGURE 17. A pawl 153 is pivotally mounted on a pin 154 which projects from the disc 146 to engage the notch 152 for rotating the bushing 148 and the parts connected thereto. A spring 155, held by a pin 156 projecting from the disc 146, urges the nose of the pawl 153 into the notch 152.

Figure 25:
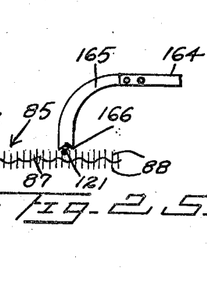
FIGURE 25 is a similar view taken at a right angle to FIGURE 24.

A ratchet wheel 157 is fixed to the disc 149 and disposed between said disc and the disc 147 and has a notch or tooth 158 facing clockwise, as seen in FIGURE 18, to be engaged by the nose of a pawl 159 which is pivoted at 160 on the disc 147. A pin 161, projecting from the disc 149, limits pivotal movement of the pawl 159, and a spring 162 connected to the pawl 159 and held by a pin 163, projecting from the disc 149, urges the nose of the pawl 159 toward the notch 158. A rod 164 is fixed to the disc 149 and extends toward the front chain guide 63, as best seen in FIGURE 5. A winding finger 165 is secured to the end of the rod 164, located nearest the chain guide 63 and is curved downwardly therefrom and has a notch 166, at its free end, as best seen in FIGURE 25.

A nut 167 is threaded on the shaft 123 between the disc 147 and the cone 128, as best seen in FIGURES 5 and 16, and a plurality of friction washers 168 are mounted on the shaft 123 between the disc 147 and nut 167.

As seen in FIGURE 5, a block 169 is fixed to and rises from the table 97 and has a female thread 170 in its upper face which is engaged by a threaded sleeve 171 secured to the shaft 123, between the bearing 124 and wall 126.

Figure 27:
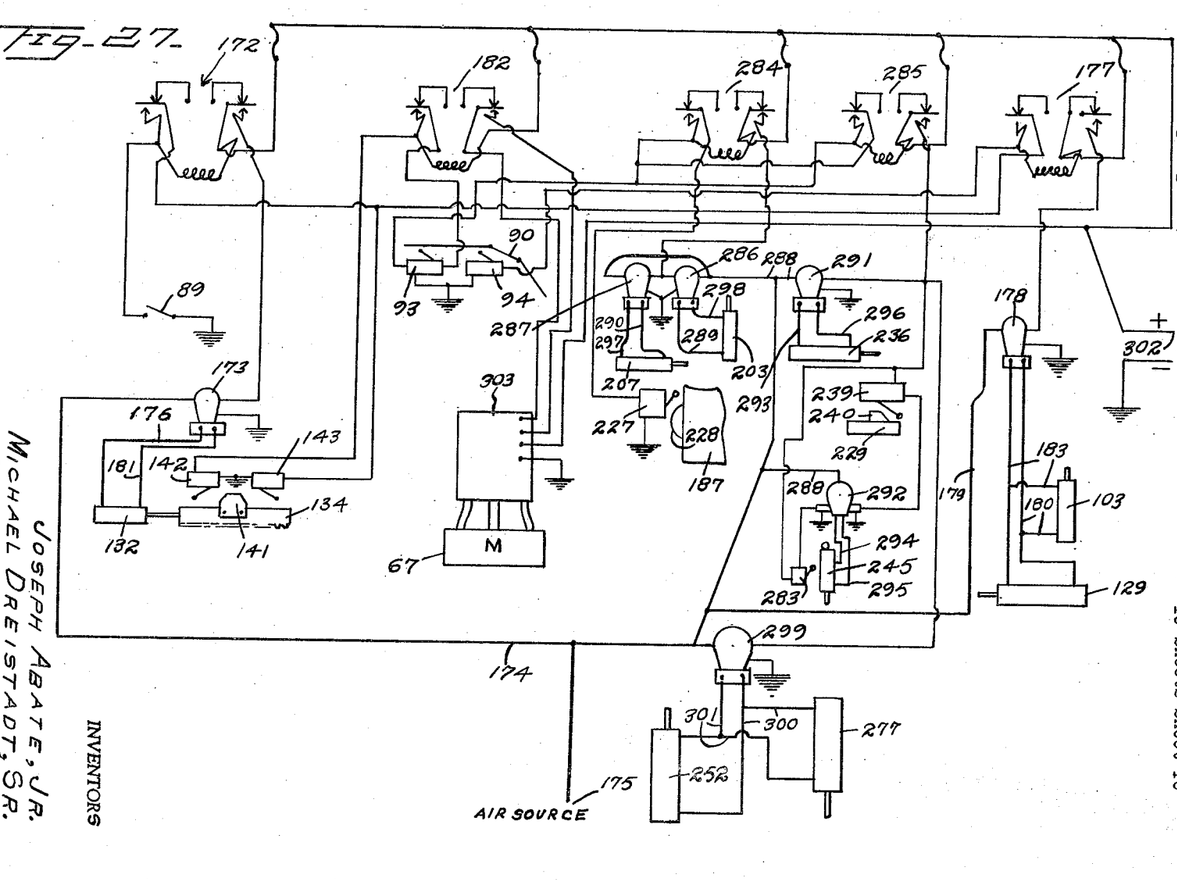
FIGURE 27 is a diagrammatic view of the electrical system and pneumatic system of the machine.

The closing of the push button 89, previously referred to, energized a relay 172 (FIGURE 27) to actuate an electric air valve 173 to which compressed air is supplied through a conduit 174 from a compressed air source 175 and from said valve through a hose 176 to the cylinder 132 for propelling the rack bar 134 from left to right of FIGURES 2 and 27. Prior to this, as previously described, when the limb core 87 actuates the switch arm 90 to close the micro-switches 93 and 94, closing of the micro-switch 93 opens the electric circuit to the motor 67 to interrupt movement of the chains 65 and 66, and the simultaneous closing of the micro-switch 94 energized a relay 177 to energize an electric air valve 178, to which compressed air from the source 175 is supplied through a branch conduit 179 and from said valve through hoses 180 to the cylinders 103 and 129, for moving the branch holding unit 101-119 to its raised operative position of FIGURE 10, and to advance the core 128 into engagement with the limb end 88, so that the branch 86 could be applied to the holder and across the limb 85, as previously described.

Thereafter, when the rack bar 134 is moved from left to right of FIGURES 2 and 9, as previously mentioned, the shaft 136 is driven clockwise and in turn drives the shaft 123 clockwise by the chain and sprocket wheel drive 138, 139. Referring to FIGURES 15 and 18, the disc 146 rotates clockwise with the shaft 123 to drive the bushing 148 in the same direction by engagement of the pawl 153 in the notch 152 for rotating the disc 147, the rod 164 and the finger 165, clockwise as seen in FIGURES 15 and 17. Initial downward movement of the finger 165 causes the notch 166 to engage the branch 86 to the right of the limb 87, as seen in FIGURES 10 and 24. The parts 164 and 165 in thereafter revolving about the axis of the shaft 123 as a center, winds the bare intermediate portion of the core of the branch 86 several times around a part of the fiber bearing portion 88 of the limb 85. While this is occurring the left hand threaded parts 170-171 cause the shaft 123 and the drive unit 145 to move slightly from left to right of FIGURE 5 so that the branch core is spirally wound on the limb. While this is occurring the spring pressed pad 108 is also pushing the limb end, engaged by the notch 166, from left to right of FIGURE 5 while the hook 115 is holding the other branch end against rotational movement in the same direction as the finger 165.

This winding operation is complete when the cam 141 engages and closes the micro-switch 143 to open the relay 172 to return the valve 173 to its normal position to cause compressed air to be supplied to the cylinder 132 through the hose 181 and bled from the hose 176 to move the rack bar 134 in the opposite direction for driving the shafts 136 and 123 in the other direction or counterclockwise of FIGURE 2. When this occurs the friction clutch 168 will cause all of the parts of the drive unit 145 to turn counterclockwise with the shaft 123, with the pawl 159 riding on the periphery of the ratchet wheel 157 until it engages in the notch 158, to stop counterclockwise rotation of the disc 149 with the rod 164 in a topmost position so that when the connected limb and branch are subsequently propelled by the chains 65 and 66 from the second station 96, they may freely pass under said rod and finger. Thereafter, only the disc 146 rotates counterclockwise with the shaft 123 and while the pawl 153 rides the peripheral surface of the ratchet wheel 151 until the parts are returned to their positions of FIGURE 5 with the sleeve 171 having moved toward or into engagement with the bearing 124.

As rack bar 134 completes this travel from left to right, FIGURE 27, cam 141 closes the micro-switch 142 to energize a relay 182 which energizes the motor 67 to drive the chains 65 and 66, as previously described, so that a limb is conveyed from the entrance station 95, as previously described, to the station 96, as the limb and branches are conveyed from the station 96 from left to right of FIGURE 1.

The micro-switch 143 also energizes the relay 177 to return the valve 178 to its normal position so that compressed air will be supplied through the hoses 183 to the forward ends of the cylinders 103 and 129 and bled from the other ends of said cylinders through the hoses 180 in order that the branch holder 101-119 can move out of engagement with the branch 86 and the cone 128 can be retracted out of engagement with the limb 85 before movement of the chains 65 and 66 commences. Referring to FIGURE 14, initial downward movement of the limb holder 101-119 causes the lower end of the hook 115 to engage the cam 120 to rock the hook counterclockwise so that the bill 114 thereof will disengage the branch 86 and allow the branch holder to move downwardly to its retracted position of FIGURE 5.

The lugs 78 are spaced apart on the chains 65 and 66 a distance corresponding to the spacing between the stations 95 and 96. A third station 184 of the machine 30 is located at a distance to the right of the second station 96, equal to twice the distance between the stations 95 and 96, so that the chains carrying the connected branches and limbs dwell midway between stations 96 and 184 and where there is no operation performed. Referring to FIGURES 1 and 6, at station 184, two of the transverse horizontal members 32 extend outwardly from beneath the front chain guide 63 and are supported by additional depending legs 33 to provide a table 185 having guide ways 186 secured to the under sides of the horizontal members 32 thereof in which side edges of a platform 187 slidably engage for slidably supporting the platform on the table. Bearings 188 rise from the inner end of the platform, located adjacent the chain guide 63, to provide journals for an axle 189 on which is mounted a roller 190. Transversely spaced posts 191 extend upwardly from the platform 87 behind the roller 190 and have a shaft 192 extending therethrough and journaled therein. Arms 193 extend upwardly and forwardly from the shaft 192 and are fixed thereto. Bearings 194 carried by the arms 193 journal an axle 195 to which is secured a roller 196 positioned above the roller 190. Pull springs 197 extend from the upper ends of the post 191 to the arms 193 for normally supporting the roller 196 in its raised position of FIGURE 6.

A post 198 having a bifurcated lower portion rises from the platform 187 behind the post 191 to provide a support for a steam conduit 199 leading from a steam supply source, not shown, and having three branch conduits 200 each equipped with a shut-off valve 201 and each having a flattened, flared discharge nozzle 202 directed between the rollers 190 and 196. The rear end of a hydraulic cylinder 203 is secured to a cross member 204 at the outer end of the table 185, as seen in FIGURE 4, and extends through the bifurcated lower part of the post 198 and has its piston rod 205 connected to an abutment member 206 which rises from the platform 187 for propelling the platform and parts supported thereby toward and away from the front chain guide 63.

A pneumatic cylinder 207 is pivotally supported at its rear end by a bracket 208 which depends from the platform 187 (FIGURE 4) and has its piston rod 209 pivotally connected to the lower end of a lever arm 210, the upper end of which is secured to the shaft 192. The arm 210 extends through a slot 211 of the platform 187 (FIGURE 6).

An electric motor 212, which is continuously driven by a separate electric circuit (not shown) is suspended from 213 is journaled in a bearing 214 which depends from the casing of the motor 212 and has two belt pulleys 215 and 216 fixed thereto. An endless belt 217 is trained over te pulley 215 and a pulley 218 which is secured to the motor shaft for driving the shaft 213 from the motor 212. A bracket 219 depends from the platform 187 and supports a shaft 220 on which is journaled a pulley 221. A brace 222 extends between the bracket 219 and the casing of the motor 212. Pulleys 223 and 224 are secured to the axles 189 and 195, respectively, and are disposed in the same plane as the pulleys 116 and 120 to receive an endless belt 225 which is trained around said pulleys and which is driven in a direction as indicated by the arrow 226 to cause the roller 196 to revolve clockwise and the roller 190 to revolve counterclockwise. The belt pulley 116 is of a conventional type capable of spreading for tensioning the belt and which takes up the slack produced in the belt 225 when the roller 196 is swung downwardly toward the roller 190, as will hereinafter be described.

As seen in FIGURE 6, a micro-switch 227 is mounted on one of the side members 32 of the table 185 to be engaged by a cam member 228 which is carried by the platform 187, for a purpose which will hereinafter be described.

Figures 8, 12:
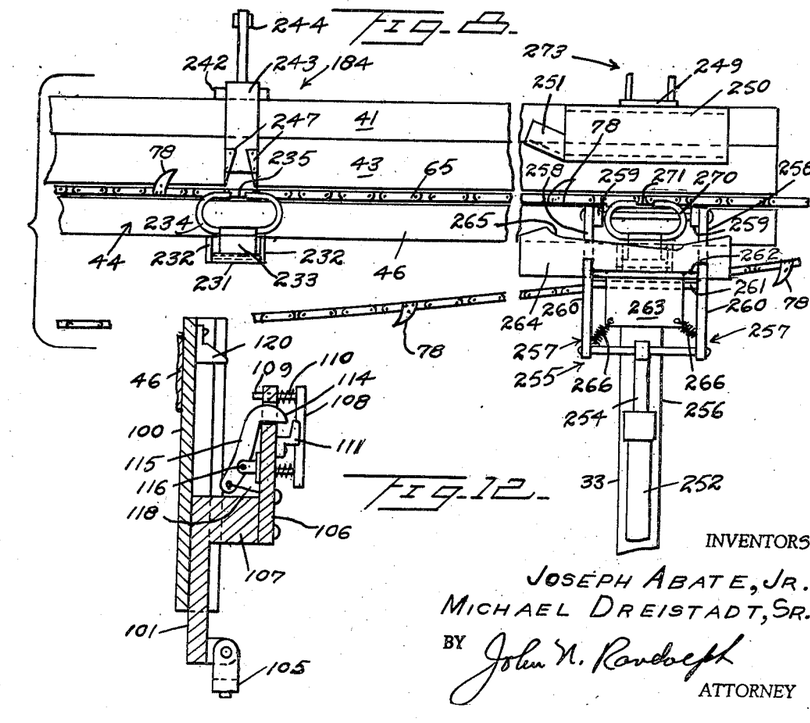
FIGURE 8 is an enlarged fragmentary longitudinal sectional view, taken substantially along a plane as indicated by the line 8—8 of FIGURE 4.
FIGURE 12 is a fragmentary vertical sectional view, taken substantially along a plane as indicated by the line 12—12 of FIGURE 7.
Figures 20, 26:
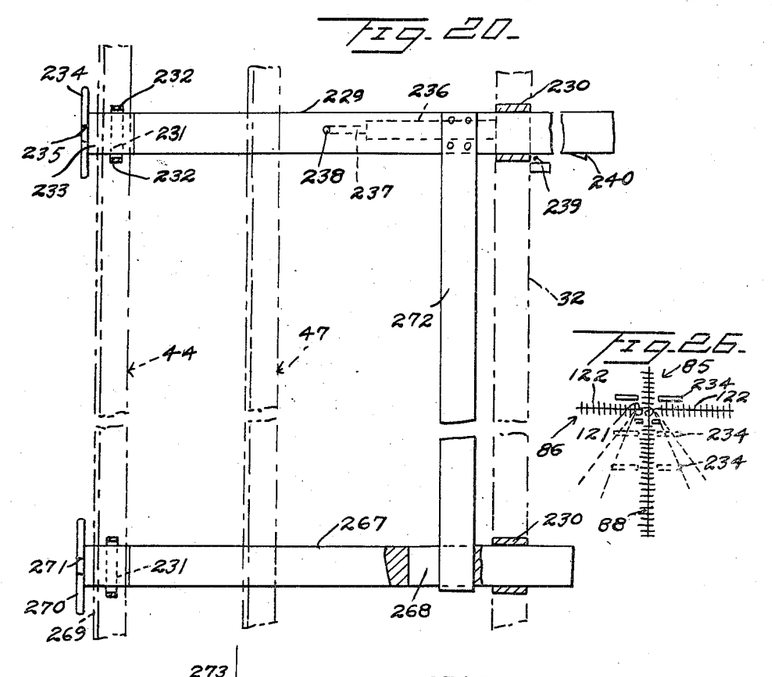
FIGURE 20 is an enlarged fragmentary sectional view, taken substantially along the line 20—20 of FIGURE 6.
FIGURE 26 is a diagrammatic view, illustrating another operation of the machine.

Referring to FIGURES 6 and 20, a bar 229 is slidably supported on the frame structure 31, crosswise thereof by a guide 230 and a roller 231. The roller 231 is mounted between hanger members 232 which depend from a part of the flange 45, as best seen in FIGURES 6 and 8. The bar 29 has an upwardly inclined end portion 233 which engages the roller 231. A horizontally elongated split ring 234 is secured to and extends upwardly from the terminal of the bar portion 233 in front of and adjacent the chain guide flange 46 and has a gap 235 in its top center disposed directly in alignment with the vertical center of the station 184 and slightly below the upper surface of the upper flight of the chain 65, in the retracted position of the bar 229, as seen in FIGURES 6 and 8. A pneumatic cylinder 236, as seen in FIGURE 6, is fastened to the supporting structure 31 beneath the bar 229 and has its piston rod 237 anchored to the bar 229 by a pin 238. A micro-switch 239 carried by a part of the supporting structure 31 is disposed to be engaged by a cam element 240, carried by the bar 229, when said bar reaches a fully projected postion.

As seen in FIGURE 6, a plate 241 is secured on the tubular member 41 and extends crosswise therefrom over the bar 229. A hinge 242 is attached to the bar 241 and extends outwardly from the member 41 and is secured to an intermediate portion of an arm 243 which extends upwardly and downwardly therefrom. The upper end of the arm 243 is pivotally connected to the piston rod 244 of a pneumatic cylinder 245, the rear end of which is pivotally connected to a bracket 246 mounted on the opposite end of the bar 241. As best seen in FIGURE 8, a pair of downwardly tapered fingers 247 are adjustably secured to and extend downwardly from the lower end of the arm 243 and, like the ring gap 235, straddle the vertical center of the third station 184.

The fourth and final station 248 of the machine 30 is located to the right of the station 184, as seen in FIGURE 1, and at a distance therefrom corresponding to the spacing between the stations 95 and 96. A bracket 249 extends forwardly from the tube 41 at the station 248 and has a pipe or tubular member 250 secured to its under side and disposed parallel to and in front of the member 41, as seen in FIGURES 1 and 4. The end of the pipe 250, nearest the station 184, has an upwardly inclined extension 251 which extends from its bottom half, which is substantially semi-circular in cross section and has its convex side facing downward, as best seen in FIGURE 2.

A pneumatic cylinder 252 is pivotally mounted at its lower end on a bracket 253 which projects from one of the legs 33 and has an upwardly extending piston rod 254 which is pivotally connected to the bight portion of a substantially V-shaped member 255 by a pivot element 256 which extends between the two corresponding angular members 257 of said member 255, as best seen in FIGURE 2. The longer inner legs 258 of the members 257 are pivotally mounted at their upper ends on brackets 259 which project from the front side of the chain guide member 46, as best seen in FIGURE 8. The other shorter legs 260 of the members 257 are connected adjacent their free ends by a shaft 261 and a rod 262, which is disposed above said shaft. A plate 263 is secured to the shaft 261 between the arms 260 and has an upper portion extending upwardly therefrom on the inner side of the rod 262 and to which is secured a shaping blade 264 having a contoured upper edge 265, as seen in FIGURE 8, for a purpose which will hereinafter be described. Pull springs 266 are secured to the lower end of the plate 263 and are anchored to lower portions of the arms 260 for urging the plate 263 and blade 264 counterclockwise, as seen in FIGURE 4 and against the stop 262.

Referring to FIGURES 1 and 20, a bar 267 which corresponds with the bar 229, except that it has a slot 268 near its rear end, is slidably mounted adjacent its rear end on the structure 31 by a second guide 230. Its upwardly inclined forward portion 269 rides on a second roller 231 which is supported by hangers 232, which depend from the member 44, in the same manner as the bar 229. A ring member 270, corresponding to the ring member 234, is fixed to and extends upwardly from the forward end of the bar 267 and is disposed in the same relationship to the chain guide 46 and chain 65 as the ring member 234 and with the gap 271 thereof in the vertical plane of the station 248. A cross bar 272 has one end secured to the bar 29 and the other end thereof engages in the slot 268, which is substantially wider than said bar, as seen in FIGURE 20.

Figures 21, 22:
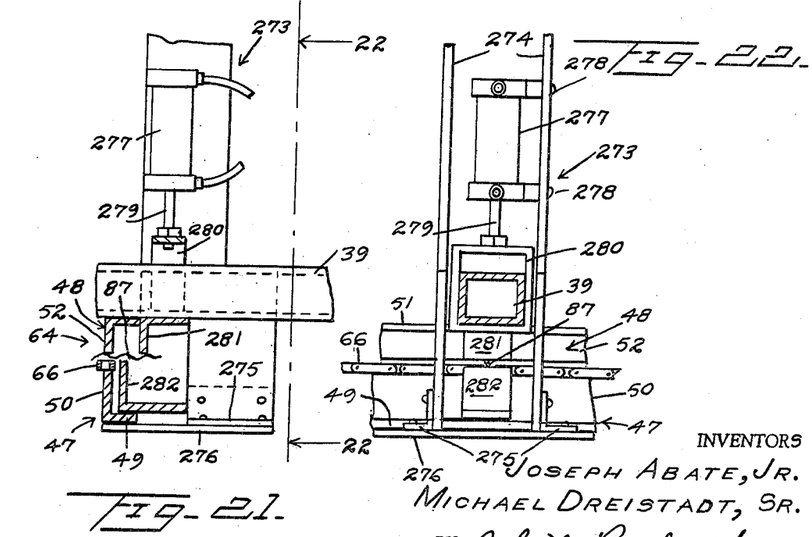
FIGURE 21 is an enlarged fragmentary vertical sectional view, taken substantially along the line 21-21 of FIGURE 1.
FIGURE 22 is a fragmentary vertical sectional view, taken substantially along a plane as indicated by the line 22—22 of FIGURE 21.
Figure 23:
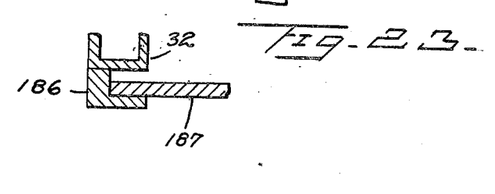
FIGURE 23 is an enlarged fragmentary vertical sectional view, taken substantially along a plane as indicated by the line 23—23 of FIGURE 6.

Also, located at the station 248 is a bending unit 273 for bending the bare core end 87 of the limb 85 and which is carried by the lower chain guide member 47, as best illustrated in FIGURES 21 and 22. The bending unit 273 includes two wall members 274 which are secured at their lower ends by brackets 275 to a plate 276 which is secured to the under side of the flange 49. The wall members extend upwardly on opposite sides of one of the members 39. A pneumatic cylinder 277 is disposed between upper portions of said wall members 274 and is secured as seen at 278 to one of the members 274. The downwardly extending piston rod 279 of the cylinder 277 is secured to the top portion of a yoke 280 which engages around the member 39 and which has vertical sliding movement relative thereto. A plate 281 extends downwardly from the bottom portion of the yoke 280 and terminates at approximately the level of the bottom edge of the chain guide wall 52, as seen in FIGURE 21. A plate 282 extends upwardly from the flange 49 and has its upper edge disposed slightly below the level of the upper surface of the upper flight of the chain 66 and is offset relative to the plate 281 toward the chain 66, as seen in FIGURE 21.

Assuming that more than three limbs 85 have been applied to the machine 30 at the entrance station 95, when the micro-switch 93 is closed, as heretofore described, to interrupt the circuit to the chain driving motor 67, said micro-switch simultaneously energizes relays 284 and 285 (FIGURE 27). Relay 284 energizes an electric air valve 286 and also an electric air valve 287 to which pneumatic pressure is supplied from the supply source 175 through a conduit 288, so that compressed air is supplied to the cylinder 203 through the hose 289 to move the platform 187 toward the chain guide 63. At the same time, compressed air is supplied from the valve 287 through the hose 290 to the forward end of the cylinder 207 for exerting a pull on the arm 210 for swinging the arms 193 and roller 196 downwardly and toward the roller 190, which rollers are revolving in opposite directions, as previously described, to engage and draw the filament bearing end 88 of the limb 85 and the two filament bearing ends 122 of the branch member 86, which are disposed at the station 184, into engagement with the rollers 190 and 196 and as steam is applied thereto from the nozzles 202 for tapering said limb and branch ends of the limb and branch member which has stopped at the station 184. The filament bearing ends 88 and 122 may also be tipped or combed by maintaining the rollers 190 and 196 closed as the platform 187 moves in and out.

At the same time, electric air valves 191 and 192 are energized by the relay 285 for supplying compressed air from other branches of the conduit 288 leading thereto, through a hose 293 from the valve 291 to the cylinder 236 for moving the bar 229 forward, and through a hose 294 from the valve 292 to the cylinder 245 for swinging the arm 243 downward.

The forward end of the bar 229 in moving forward from right to left of FIGURE 6 is initially displaced upward by its inclined portion 233 engaging the roller 231 to cause the opening 235 of the ring 234 to move upward around the bare limb core 87, adjacent the chain 65, after which the split ring 284 moves outwardly while engaging around on the limb 85 and into engagement with the two branch portions 122 which are projecting outwardly in opposite directions horizontally from the limb 85, for bending said branch portions toward the limb portion 88, so that the three parts will be engaged by the rollers 190 and 196 as said rollers move toward said limb and branch portions and are closed, as previously described. After the ring 134 has passed under the fingers 247 and has begun to bend the branch portions 122 toward the limb end 88, as illustrated by the intermediate position of the ring member 234 in FIGURE 26, the arm 243 swings downwardly to cause the fingers 247 to assume positions between the limb portion 88 and branch portions 122, so that as the ring member 234 continues to move toward its outermost dotted line position, the branch portions will be bent around the fingers 247 in arcuate formations, adjacent the point of attachment of the branch to the limb.

As the ring 234 reaches the outermost extremity of its travel, the cylinder 245 will strike the micro-switch 283 (FIGURE 6) for reversing the valve 292 so that air will be supplied under pressure thereto through the hose 295 and will be bled from the cylinder 245 through the hose 294 for causing the arm 243 to swing clockwise to raise the fingers 247 out of engagement with the limb and branch portions.

Immediately after this occurs, the cam 240 carried by the bar 229 engages and closes the micro-switch 239 to reverse the valve 291 so that compressed air is supplied to the cylinder 236 through the hose 296 and bled therefrom through the hose 293 to cause the bar to be retracted from left to right of FIGURE 6 and back to its position of FIGURE 6.

At approximately the same time that the bar 229 begins its return travel, the platform 187 will have reached its forwardmost position and the cam 228 carried thereby will engage and close the micro-switch 227 for reversing the valves 286 and 287 so that compressed air will be supplied to the cylinder 207 through the hose 297 and bled through the hose 290 for exerting a thrust on the arm 210 to swing the arms 193 upwardly to raise the roller 196 so that the limb portion 88 and branch portions 122 will be released from the rollers. At the same time, air is supplied under pressure from the valve 286 through the hose 298 to the cylinder 203 and bled therefrom through the hose 289 for causing the platform 187 to be retracted away from the chain guide 63, to complete the operations performed on the limb and branch portions at the third station 184.

Assuming that a limb and branch unit is also located at the fourth and final station 248, at the same time that the aforedescribed operations are being performed automatically at stations 96 and 184, the final shaping operations are accomplished at station 248 by the relay 285 energizing the electric air valve 289 which is also connected to the air supply source 175 by another branch of the conduit 288 and from which air is supplied through the hoses 300 to the cylinders 252 and 277. The limb and branch portions in approaching station 248 from left to right of FIGURE 2 are deflected downwardly by the deflector element 251 to assume positions under the pipe 250. As the bar 229 was initially moving forward, as previously described, the bar 272 was moving in the slot 268 and into engagement with the forward end of said slot to cause the bar 267 to move forwadly thereafter in unison with the bar 229. The ring 270 thereof is initially displaced upwardly in the same manner as heretofore described in reference to the ring 234 for positioning the limb core 87 therein, after which the ring 270 moves outwardly for holding the branch portions 122 at a proper angle relative to the limb portion 88 and while the member 255 is being swung upwardly about its pivot 259 by the compressed air being supplied to its cylinder 252 through the hose 300 for causing the contoured upper edge 265 of the plate 264 to engage the limb portion 88 and the branch portions 122, being held by the ring 270, for bending said portions upwardly and while the limb and branches are being held from above by the pipe 250. As the plate 264 swings upwardly and inwardly, the springs 266 allow said plate to pivot about its axis 261 in a clockwise direction, as seen in FIGURE 4, to complete the shaping operation of parts 88 and 122.

At the same time, the compressed air being supplied to the upper end of the cylinder 277 forces the piston rod 279 and yoke 280 downwardly for moving the plate 281 downwardly to bend the terminal of the bare end of the core 87 downwardly about the upper edge of the plate 282 as a fulcrum to cause the core portion located between the plates 281 and 282 (FIGURE 21) to assume a proper angle with respect to the remainder of the core 87 so that when inserted into an upwardly and outwardly inclined socket of an artificial tree trunk, not shown, the connected branch and limb will be disposed at a proper, natural appearing angle to the tree trunk.

These aforedescribed operations at station 248 are completed before the bar 272 is retracted by the bar 229 and before the cam 141 closes the micro-switch 142 which, in addition to energizing the motor 67, also energizes the relay 285 for reversing the valve 299 so that air is supplied to the cylinders 252 and 257 through the hoses 301 and is bled through the hoses 300 for causing the piston rod 254 to be drawn downwardly for swinging the member 255 downwardly and out of engagement with the branch and limb portions and at the same time moving the plate 281 back to its raised position of FIGURE 21, so that when movement of the chains 65 and 66 is resumed the completed limb and branch combination will be conveyed from station 248 from left to right of FIGURE 2 and discharged from the right hand end of the machine 30 into any suitable container or on to any suitable conveyor, not shown, provided to receive the completed limb and branch units.

Electric current is supplied to various electrical parts illustrated in FIGURE 27 from any conventional 115 volt alternating current source 302. A conventional control unit 303 may be provided for the motor 67.

Sufficient clearance exists between the upper flight of the chain 65 and the upper chain guide 43 so that, if desired, the portion of the core 87 or the limb 85 which engages said chain guide may have filaments 88 radiating therefrom, so that the filament bearing portion of the limb core may extend nearly to the part of the core which engages the chain 66.

As sen in FIGURES 1 and 5, paint receptacle 304 may be adjustably mounted on one of the horizontal cross members 32 by a clamping device 305, behind the chain guide 47. A roller 306 is journaled in the receptacle 304 so that a portion thereof extends into the paint 307 in said receptacle. The upper portion of the paint roller extends to above the level of the upper flights of the chains 65 and 66 so that the bare terminal of each limb core 87 in passing the roller 306 will embed itself therein for turning said roller and so that said core portion will be coated with the paint. Different colored paints may be used for indicating where different limbs are to be applied with relation to the upper and lower ends of the tree trunk.

Various modifications and changes are contemplated and may be resorted to, without departing from the function or scope of the invention as hereinafter defined by the appended claims.

We claim as our invention:

1. In a machine for assemblying and shaping artificial tree limbs and branches, means engaging the bare end of a twisted wire core of an artificial tree limb for supporting the limb, a branch holder engaging one end portion of an artificial branch member, composed of a twisted wire core having a bare intermediate portion and end portions each having a mass of filaments radiating in all directions therefrom, for supporting the intermediate portion of the branch core across a part of the other limb end having a mass of filaments radiating in all directions from the core, a branch winder including a rotary driven shaft, a branch engaging finger, and means connecting said finger to the shaft for positioning the finger in laterally offset relation to the axis of the shaft for engagement with the other end portion of the branch member to revolve said last mentioned end portion around the limb when the finger is revolved by the shaft for winding the intermediate portion of the branch core around the limb.

2. In a machine as in claim 1, means moving said shaft axially thereof in a direction away from the limb as the shaft is revolved for winding the branch core spirally on the limb.

3. In a machine as in claim 1, said means connecting the finger to the shaft including a drive unit having a first part secured to and rotatable with the shaft, a second part with which the finger revolves, a non-rotatable third part in which the shaft is journaled, a pawl and ratchet means forming a driving connection between the first and second parts for driving the finger in one direction only for winding the branch core on the limb, a friction clutch means connecting the shaft to the second part for causing the second part to rotate in the opposite direction with the shaft, and a second pawl and ratchet means connecting said second part to the third part for limiting rotation of said second part with the shaft for causing the finger to disengage said last mentioned end of the branch member and assume a position above and out of engagement with the connected limb and branch.

4. In a machine as in claim 1, said branch holder including a vertically movable slide having a plate disposed in a vertical plane and provided with an upwardly opening recess engaging the limb core in a raised operative position of the slide, an upwardly opening hook member carried by the plate and engaging under a part of the first end portion of the branch member in the operative position of the slide, a pivotally mounted hook carried by the plate and engaging over a part of said first mentioned end portion of the branch member, a pad member slidably connected to and spring urged away from the plate and engaging a part of the other end portion of the branch member in the operative position of the slide, and means for camming the pivoted hook out of engagement with the branch member as the slide is displaced downwardly to an inoperative position.

5. In a machine as in claim 1, said machine including an elongated supporting structure, said means engaging the bare end of the limb core including portions of the upper flights of two endless chains disposed in parallel relation to one another, each of said chains having a chain guide including upper and bottom guide members disposed in the same vertical plane and between which the upper chain flight travels, chain guide supports mounted on said supporting structure and supporting said chain guides, lugs fixed to corresponding sides of the chains and projecting outwardly therefrom for travel with the upper flights of the chains along corresponding sides of the upper chain guide members, the lugs of the two chains being disposed in transverse alignment whereby a lug of each chain will simultaneously engage the bare limb core when supported on the upper flights of the chains, said chain guides having means forming an entrance station through which the bare limb core is applied to the upper chain flights, and means for intermittently driving the chains simultaneously from a first dwell position at said entrance station to a second dwell position where the limb is disposed in alignment with a part of said branch holder.

6. In a machine as in claim 5, a third station to which the connected limb and branch is conveyed by said upper chain flights from said second station and disposed at another dwell position of the chains, means slidably mounted crosswise of the supporting structure and engaging around the limb at the third station for bending the branch portions outwardly and toward the filament bearing end portion of the limb when said last mentioned means is moved outwardly to a projected position, a pair of vertically spaced rollers, means supporting said rollers at said third station for movement toward and away from said last mentioned limb and branch portions, means for closing the rollers on said limb and branch portions when disposed in engagement therewith, means for injecting steam between the rollers and onto the limb and branch portions engaged thereby, and means for simultaneously driving the rollers in opposite directions for drawing the limb and branch portions therebetween to effect a tapering of the filaments thereof around the ends of the limb and branch cores from which said filaments project.

7. In a machine as in claim 6, means mounted on one of said chain guides at said third station for vertical swinging movement and including members disposed to straddle the limb beyond said branch portions and between said branch portions and said means for bending said branch portions for causing the core of the branch portions to be bent arcuately around said members.

8. In a machine as in claim 7, said machine including a fourth station disposed beyond said third station in the direction of travel of the upper chain flights and located at another dwell position of the limbs carried by said upper flights, a stationary member supported on one of said upper chain guides for engaging over the limb and branch portions at said fourth station, a bending device slidably mounted crosswise of the supporting structure at the fourth station for embracing the limb and for holding the branch portions at desired angles relative to the limb in a projected position thereof, a shaping blade having a contoured upper edge engaging under the filament bearing limb and branch portions, and means swingably supporting said blade at said fourth station for bending the limb and branch portions upwardly to a desired angle when said blade is swung upwardly.

9. In a machine as in claim 8, and a core bending unit located at said fourth station and supported by one of said chain guides for bending the terminal portion of the limb core to a predetermined angle relative to the remainder of the limb core.

10. In a machine as in claim 9, and means for adjusting one of said chain guides and the chain engaged thereby crosswise of said supporting structure and toward and away from the other chain and chain guide for accommodating the machine to limbs of different lengths.

11. In a machine as in claim 10, and means for causing the various operations on the limb and branch member to be performed automatically and simultaneously at said second, third and fourth stations after the branch member is applied manually to the branch holder and by the manual closing of an electric switch.

12. A method of assembling and shaping artificial tree limbs and branches comprising the step of engaging and intermittently conveying an artificial tree branch composed of a twisted wire core having a multiplicity of filaments radiating from one end portion thereof and an opposite bare end, the step of winding the bare intermediate portion of the twisted wire core of a branch member around a portion of the core of the limb from which the filaments project so that end portions of the branch core, from which masses of filaments radiate in all directions, will project outwardly in opposite directions from the limb at one dwell position of the limb, the step of bending the branch portions to desired angles relative to the limb at another dwell position of the limb, the step of tapering the filament masses around the extremities of the branch and limb cores to enclose and conceal said core terminals at said last mentioned dwell position, and the step of holding portions of the limb and branches at another final dwell position and while limb and branch portions, disposed outwardly thereof, are bent upwardly to a desired angle.

13. A method as defined by claim 12, including the step of bending the terminal portion of the bare end of the limb core downwardly at said final dwell position.

14. In a machine as in claim 4, a member for engaging over and holding the filament bearing end of the limb while the branch core is wound thereon, and means for supporting said last mentioned member for sliding movement axially of the shaft toward and away from the limb.

References Cited

UNITED STATES PATENTS

| | | | |
|---|---|---|---|
| 3,330,603 | 7/1967 | Gelardi | 300—21 |
| 3,365,529 | 1/1968 | Dieffenbach | 300—21 |
| 3,370,345 | 2/1968 | Mattie | 29—505 |

GERALD A. DOST, Primary Examiner

U.S. Cl. X.R.

21—1; 29—429; 300—21